United States Patent
Werden et al.

(10) Patent No.: US 7,970,414 B1
(45) Date of Patent: Jun. 28, 2011

(54) SYSTEM AND METHOD FOR PROVIDING ASSISTED GPS LOCATION SERVICE TO DUAL MODE MOBILE STATION

(75) Inventors: Steven Werden, Bridgewater, NJ (US); Iftekhar Rahman, Billerica, MA (US); John Seeman, Hillsborough, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 612 days.

(21) Appl. No.: 12/081,968

(22) Filed: Apr. 24, 2008

(51) Int. Cl.
*H04W 24/00* (2009.01)
(52) U.S. Cl. ............... 455/456.1; 455/432.1; 455/456.2; 455/552.1
(58) Field of Classification Search ............... 455/456.1, 455/456.3, 67.11, 67.13, 226.2, 226.3, 552.1, 455/456.2, 432.1
See application file for complete search history.

(56) References Cited

U.S. PATENT DOCUMENTS

| | | | |
|---|---|---|---|
| 7,495,608 B1 | 2/2009 | Chen et al. | |
| 2004/0192342 A1* | 9/2004 | Ranganathan | 455/456.1 |
| 2006/0211430 A1 | 9/2006 | Persico | |
| 2006/0258365 A1 | 11/2006 | Cha et al. | |
| 2007/0072623 A1 | 3/2007 | Shyr et al. | |
| 2007/0171126 A1 | 7/2007 | Gaal | |
| 2007/0182630 A1 | 8/2007 | Angus | |
| 2007/0216575 A1 | 9/2007 | DiEsposti | |
| 2007/0229355 A1 | 10/2007 | Han et al. | |

OTHER PUBLICATIONS

"GPS Signals" printed from http://en.wikipedia.org/wiki/GPS_signals on Oct. 3, 2007.
"Global Positioning System" printed from http://en.wikipedia.org/wiki/Global_Positioning_System on Oct. 3, 2007.
"Pseudorange" printed from http://en.wikipedia.org/wiki/Pseudorange on Oct. 3, 2007.
"Assisted GPS" printed from http://en.wikipedia.org/wiki/A-GPS on Oct. 15, 2007.
Chaplin, Kevin, "Wireless LANs vs. Wireless WANs" White Paper 2130273, Rev. 1.0 Nov. 18, 2002, Sierra Wireless.
"Overview of Location Technologies", Openwave, Nov. 19, 2002.

\* cited by examiner

*Primary Examiner* — Temica M Beamer
(74) *Attorney, Agent, or Firm* — McDermott Will & Emery LLP

(57) ABSTRACT

A system for determining position of a mobile station is provided. The mobile station is equipped with a GPS receiver for receiving satellite signals from satellites. The system comprises a wireless wide area network (WWAN) configured to provide an acquisition assistance data for use in acquiring the satellite signals by the GPS receiver to the mobile station that is operable in the WWAN. A position determination entity (PDE) is provided to determine position of the mobile station based on the satellite signals received sent from the mobile station and the acquisition assistance data from the WWAN. A wireless local area network (WLAN) provides RF signals to the mobile station when the mobile station enters into a WLAN area. The mobile station determines the position of the mobile station using the WWAN transceiver and the GPS receiver at the time when the mobile station enters into the WLAN area. The MS then uses this position when it is operating in the WLAN and it is requested to provide location by a LBS application or by the emergency 911 calling service.

15 Claims, 3 Drawing Sheets

SYSTEM AND METHOD FOR PROVIDING ASSISTED GPS LOCATION SERVICE TO DUAL MODE MOBILE STATION

TECHNICAL FIELD

The present subject matter relates to techniques and equipment to providing an assisted GPS location service to a dual mode mobile station that is operable in a Wireless Local Area Network (WLAN) and a Wireless Wide Area Network (WWAN).

BACKGROUND

Many new communications devices and related services have emerged, to allow people to communicate freely as they roam, without the need for a fixed network connection. In particular, modern digital public wireless telephone networks offer customers a wide range of voice and data communication services combined with a high degree of mobility. In this context, situations arise in which it is desirable to obtain information about the physical or geographic location of a mobile communication terminal and/or its user. For example, some carriers offer services in which the user at the mobile station may request location information and/or information about the surrounding geographic locale, for display on or audio presentation from the mobile station. As another example, some carriers and/or other providers offer location services that allow an authenticated third party to request and obtain the location of a mobile station, for example, so that a parent can obtain information about the location of a child or other relative. Emergency services, such as E911, also requires accuracy regarding the current location of the mobile terminal device.

Increasingly, Global Positioning System (GPS) is used to track the location of a mobile terminal device. The GPS determines the location of an object by using GPS satellites orbiting the earth. As a GPS enabled mobile station has been introduced, and to support such services, a network architecture has been developed that includes a Position Determining Entity (PDE), which communicates with a Mobile Station (MS) having a GPS receiver to determine the location of the MS. To enhance performance beyond that of the GPS receiver in a stand-alone mode, the mobile communication industries have developed Acquisition Assistance (AA), or Assisted GPS. With this approach, the PDE or another node of the wireless communication network provides satellite signal code phase (i.e., signal timing) data to the mobile station. For the PDE to provide the satellite signal code phase data to the mobile station, the MS must first send the pseudo-noise (PN) pilot signal phase offsets of multiple WWAN Base Transceiver Stations (BTSs), which it receives from the WWAN BTSs, to the PDE. The PDE or another node of the wireless communication network helps a mobile station equipped with a GPS receiver to perform the tasks required to make range measurements and position solutions. The PDE or another node of the wireless communication network communicates with the mobile station equipped with the GPS receiver via a wireless link. The Assisted GPS system, consisting of the integrated GPS equipped mobile station and wireless network components, prevents the mobile station from spending precious time on obtaining the satellite almanac data from invisible satellites that sends weak signals, since the PDE provides the mobile station with satellites which is in clear view of the mobile station and sends strong satellite signals enough at that location to reliably demodulate ephemeris data.

Wireless local area network (WLAN) technologies, such as IEEE 802.11, or the like, were originally developed to provide wireless links for data devices, e.g. as a substitute for a wired local area network (LAN) within a premises or campus environment. However, as WLAN capabilities have expanded and multimedia communications have become more common, WLAN service has also come to support many of the services offered in the public sector via the WWAN. Dual mode devices have been developed that operate via a WLAN, when available and operate via a WWAN at other times.

In the meantime, as dual mode mobile stations operable in a Wireless Wide Area Network (WWAN) as well as a Wireless Local Area Network (WLAN) have been introduced, most of application services that are provided in the WWAN area are required to be available in the WLAN area. In case of the GPS service or the Assisted GPS service, when the dual mode mobile station enters into the WLAN area, the GPS signals may be too weak to be used in determining position of the mobile station, since the WLAN area may be in an indoor environment such as inside of a building. Morever, when the WLAN transceiver is turned on in the WLAN area the MS needs to turn off its WWAN transceiver to conserve its battery power. Therefore GPS signals from satellites and RF signals from the WWAN cannot be used for finding the location of the mobile station.

A need exists for a device and a method which enhance position determination performance of mobile stations in the WLAN area.

SUMMARY

The teachings herein alleviate one or more of the above noted problems relating to providing position determination of a mobile station at a Wireless Local Area Network (WLAN).

The teachings below encompasses a method for determining position of a mobile station equipped with a GPS receiver in which the mobile station is operable in a wireless wide area network (WWAN) and a wireless local area network (WLAN). It is detected whether the mobile station enters into the WLAN area. Position of the mobile station is determined based on satellite signals from the GPS receiver and RF signals from the WWAN before or at the time of transition into the WLAN when the mobile station enters into the WLAN area. The determined position of the mobile station is stored in the mobile station for a position of the mobile station in the WLAN area.

The entrance of the mobile station into the WLAN area may be sensed by determining whether a radio signal from the WLAN exceeds a predetermined threshold.

Often, the mobile station does not receive the RF signals from the WWAN and the satellites signals from the GPS receiver after the mobile station is registered to the WLAN and the mobile station determines the position of the mobile station based on the acquisition assistance data from the WWAN or the satellite signals from the GPS receiver.

The stored position may be used as the position of the mobile station in the WLAN area. The mobile station retrieves the stored position of the mobile station when a location based service application installed in the mobile station requests the position of the mobile station. The mobile station sends the stored position via a communication link of the WLAN to an external entity which requests the position of the mobile station.

In a specific example, when the mobile station has position information of satellites, position of the mobile station is calculated based on the position information of satellites and the position of the mobile station is stored in the mobile station. The mobile station measures PN signal phase offset of radio signals from a base station of the WWAN when the mobile station does not have position information of satellites. The mobile station sends information about the PN signal phase offset and Base Transceiver Systems (BTSs) corresponding to the PN signal phase offset and requests the position information of satellites corresponding to satellites that are available to the mobile station based on the information about the PN signal phase offset and the BTSs to a Position Determination Entity (PDE). The PDE sends stored satellite information corresponding to satellites serviceable to the mobile station based on the information about PN signal phase offset and the BTS. The mobile station receives satellite signals from the serviceable satellites identified by the PDE.

It is determined whether position of the mobile station from satellite signals is received from at least three of the serviceable satellites. The mobile station determines pseudo ranges of at least three of the serviceable satellites and measures PN signal offsets of BTSs. The position of the mobile station is calculated and the calculated position is stored in the mobile station when the mobile station receives satellite signals from at least three of the serviceable satellites.

When the mobile station does not receive satellite signals from at least three of the serviceable satellites, the mobile station sends the obtained information about satellites and BTSs to the PDE. The PDE calculates and sends position information of the mobile station to the mobile station and for storing the position information.

Another aspect of the disclosure encompasses a dual mode mobile station that is operable in a wireless wide area network (WWAN) and a wireless local area network (WLAN). The mobile station includes one or more transceivers, for wireless communications via the WWAN, for wireless communications via the WLAN, and for receiving signals from one or more GPS satellites. The mobile station further includes a processor coupled to the one or more transceivers for controlling operations of the dual mode mobile station, a memory coupled to the processor, and programming stored in the memory.

Execution of the programming causes the processor to control operations of the dual mode mobile station so as to implement functions for determining position of the mobile station. The functions include receiving position data for the mobile station from the WWAN, determining a position of the mobile station from received position data and/or from measurements of GPS satellite signals received by the GPS receiver, and storing the determined position of the mobile station in the memory, for use as the position of the mobile station while operating via the WLAN.

In an example, the position data of the mobile station is determined by a position determination entity (PDE) that is located in the WWAN or the WLAN based on the satellite signals from the GPS receiver and the location acquisition assistance data from the WWAN when the mobile station enters into the WLAN area. The entrance of the mobile station into the WLAN area typically is known by the time when the RF signal from the WLAN exceeds the threshold level.

A location based service (LBS) application requests the position data of the mobile station, and the stored position data of the mobile station is provided to the LBS application in response to the request of the LBS application.

The mobile station sends the position data to a node which requests the position data of the mobile station when the mobile station requests an application service which requires the position data of the mobile station to the node.

Often, the WWAN radio transceiver is turned off after the mobile station receives the position data of the mobile station at the time when the RF signal from the WLAN exceeds the threshold level.

Another aspect of the disclosure encompasses a system that determines position of a mobile station where the mobile station is equipped with a GPS receiver for receiving satellite signals from satellites. The system is implemented with a Wireless Wide Area Network (WWAN) and a Wireless Local Area Network (WLAN). The WWAN is configured to provide an acquisition assistance data for use in acquiring the satellite signals by the GPS receiver to the mobile station that is operable in the WWAN. A position determination entity (PDE) determines position of the mobile station based on the satellite signals received from the mobile station and the acquisition assistance data from the WWAN. A wireless local area network (WLAN) provides RF signals to the mobile station when the mobile station enters into a WLAN area. The mobile station uses the position of the mobile station determined before or at the time when the mobile station enters into the WLAN area as the position of the mobile station while operating in the WLAN area. The acquisition assistance data may include satellite ephemeris data, a list of visible satellites, local time and estimates of satellite position.

As a result, the dual mode mobile station can save power and spend less time to determine its location in the WLAN area, e.g. if reception of RF signals from the WWAN is poor, since the dual mode mobile station uses its already stored location information for determining its position in the WLAN area, which is obtained at the time of mobile station's entrance into the WLAN area, while not trying to calculate its position as same as in the WWAN area in which the acquisition assistance data is obtained from a node of the WWAN and position of the mobile station is calculated based on the acquisition assistance data.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein provides a mobile station equipped with a GPS receiver with a position determination service in a Wireless Local Area Network (WLAN) area. A system to determine position of a mobile station includes the mobile station equipped with a GPS receiver which receives satellite signals from satellites. The system is implemented with a Wireless Wide Area Network, a Position Determination Entity (PDE), and the WLAN. The WWAN provides an acquisition assistance data for use in acquiring the satellite signals by the GPS receiver to the mobile station that is operable in the WWAN. The PDE determines position of the mobile station based on the satellite signals received from the mobile station and the acquisition assistance data from the WWAN. The WLAN provides RF signals to the mobile station when the mobile station enters into the WLAN area. The mobile station uses the position of the mobile station determined before or at the time when the mobile station enters into the WLAN area as the position of the mobile station in the WLAN area.

Figure 1:
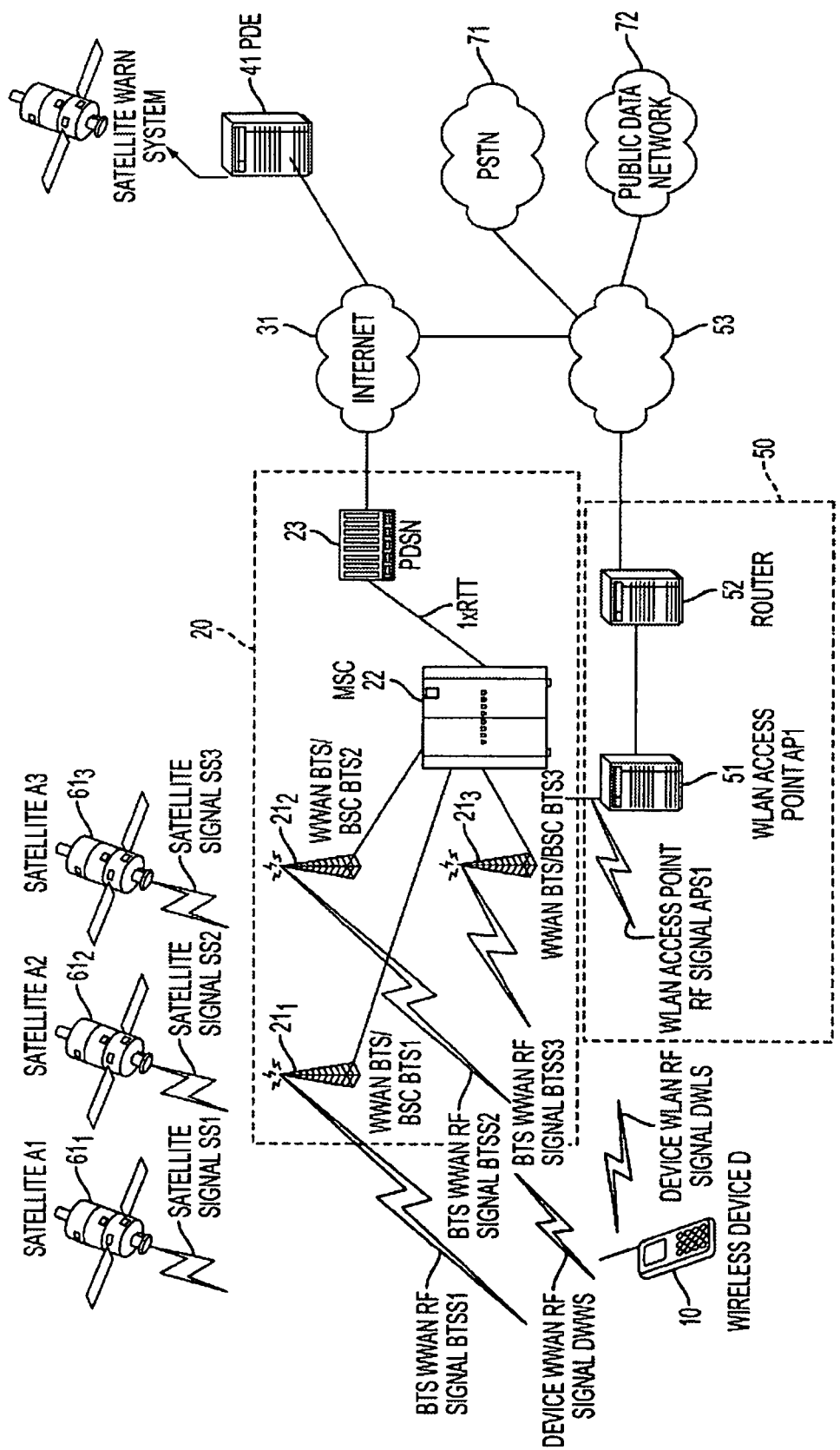
FIG. 1 is a functional illustration of equipments of a Wireless Wide Area Network (WWAN) and a Wireless Local Area Network (WLAN) for providing communication services as well as GPS location determination for a dual mode mobile station.

Reference now is made in detail to the examples illustrated in the accompanying drawings and discussed below. FIG. 1 is a functional illustration of a WWAN and a WLAN networks with a GPS location determination system, for providing services to a dual mode mobile station, which include position determination based on measurements of signals from one or more satellites. Although the present concepts are applicable to other network architectures, for this discussion, it is assumed that the WWAN is public cellular network of the type and the WLAN is a wireless network provided based on 802.11 series protocol such as WiFi, represented in high level functional block diagram form in FIG. 1.

Each mobile service provider or mobile network carrier typically operates a network, that includes one or more base stations and one or more switching elements, e.g. Mobile Switching Centers (MSCs) or packet-based switching equipment. For discussion purposes, the drawing shows a simplified version of the public wireless network 20 operated by one carrier to provide mobile communication services to a number of mobile stations 10. As discussed more later, the mobile station 10 is one currently receiving service through a portion of the network 20 of the carrier. A WLAN 50 that provides a communication connectivity to the mobile station 10 in a relatively small area may be operated or affiliated with operator of the public wireless network 20 or is run by a separate entity.

The drawing also depicts a number of the satellites 61 ($61_1$ to $61_3$) of the global positioning system (GPS). Although the satellites are separate from the carrier operated mobile communication network 20, in the example, the mobile station 10 does receive and process signals from the satellites 61 as part of the operations for determining position. As discussed more below, the carrier's network 20 offers Acquisition Assistance (AA) to help in obtaining the final GPS fix of each mobile station's position.

It is assumed that those skilled in the art are familiar with modem wireless communications networks, such as public cellular telephone and data networks, in which it may be desirable to locate a particular user and/or mobile terminal device. However, to provide a context for the later processing examples and to facilitate easy understanding, it may be helpful here to summarize the structure and operation of the exemplary networks 20 and 50.

In the public wireless communication network of FIG. 1, the wireless service communication network 20 provides voice telephone communications to subscribers, and one or more of the networks may offer data services. For purposes of this example, the public wireless communication network is a WWAN that is implemented using circuit switched (CS) network, such as Code Division Multiple Access (CDMA). The WWAN 20 enables users of the mobile stations 10 to initiate and receive telephone calls to each other as well as through the public switched telephone network (not shown). Today, the WWAN 20 also typically enables users of appropriately equipped mobile stations 10 to initiate and receive various data communications, for example via the public data network referred to as the Internet, although for convenience, additional public network elements supporting packet data communications have been omitted.

The WWAN 20 provides these wireless communication services for mobile stations in accord with a digital protocol. The WWAN 20 includes mobile station centers (MSCs) or packet-based switching equipment. For purposes of discussion, the drawing shows one of the MSCs 22 of the carrier's network 20. Each MSC connects through trunk circuits to a number of base stations, which the respective MSC controls. The example shows three of the carrier network base stations $21_1$ to $21_3$ (represented by the radio towers thereof in the drawings) controlled by the MSC 22, in the carrier's network 20.

The Base Transceiver System (BTS) at a base station 21, is the part of the radio network that sends and receives RF signals to/from the mobile stations 10 that the base station currently serves. The base station connects to and communicates through the antenna systems on a radio tower. The base station transceiver system at a site contains the transmitters and receivers and is responsible for the control, monitoring, and supervision of calls made to and from each mobile station within its serving area or "cell," over the wireless air link.

For wireless services, mobile stations are provisioned to normally operate in the serving area of one wireless network operated by the user's access service provider or carrier, and this radio system is referred to as the "home" location or system. In the example, the station 10 is homed on a portion of the network 20.

There are a number of different techniques for obtaining data that may be processed to determine the location of a mobile station. The cell sites and/or MSC may provide cell and sector data for one or more base stations detecting signals from the mobile station 10 in question. Signal strength data may also be available. Some networks 20 include equipment to tri-laterate on signals received by the mobile station 10 from the BTSs $21_1$ to $21_3$. Such tri-laterations requires knowledge of the location and other information about each base station that may be serving a mobile station for which the system will make or assist in a position determination.

In the example, the service provider's portion of the network 20 provides information for Advanced Forward Link Trilateration (AFLT). As discussed more later, AFLT relies at least in part on accurate and comprehensive base station information, typically maintained in a Base Station Almanac (BSA) database (not shown). The AFLT data could be used for providing a final fix, although for purposes of the discussion of GPS and the acquisition assistance, the tri-lateration is used to help select a subset of GPS acquisition data to assist the mobile station 10 in its measurements of signals from satellites 61. Hence, a position determination by the network 20 based on AFLT provides a preliminary fix or "pre-fix" for providing acquisition assistance on GPS satellites to the MS. If enough (3 or more) satellite signals cannot be detected by the MS then the network can fall back on using AFLT for the final fix. This generally requires the MS to obtain pilot signal phase offsets from BTSs after those obtained for the "pre-fix" calculations.

In this example, each mobile station 10 includes a GPS receiver for use in determining the station's location. GPS or the "Global Positioning System" is a satellite-based navigation system. A constellation of orbiting satellites 61 broadcasts specially coded signals that can be processed in a GPS compatible receiver, enabling the receiver or other processing device to compute position, velocity and time information. To expedite mobile station measurements, however, the network 20 provides the stations acquisition assistance data upon request.

A GPS position determination requires a GPS receiver to take measurements from signals received from a number (typically four or more) of the satellites of the GPS system. The array or constellation of GPS satellites transmit highly accurate, time coded information, which a GPS receiver processes in order to determine its three-dimensional location on the Earth. The constellation of GPS satellites provide coverage over the entire surface of the Earth. However, over any given point on the globe, only a smaller subset of the constellation of GPS satellites will provide receivable transmissions or be 'in view' in the particular area.

To perform location computations requires certain data about the transmitting GPS satellites. Ephemeris data or "ephemerides" specifies the precise orbit of each satellite and can be used to calculate the current location of each satellite. The satellites transmit the ephemeris data for use by GPS receivers, and a ground control station periodically updates the ephemeris data to maintain accuracy. Almanac data is a subset of ephemeris data. Each GPS satellite broadcasts the almanac data for all the GPS satellites in the GPS constellation. A GPS receiver can capture the almanac data and/or the ephemeris data by locking onto the signal from one satellite. However, the transmission time for the data is relatively long. When a receiver must wait while it captures this data, the time to first position computation (first fix) may be several minutes or more, which is typically unacceptable for mobile station applications.

The network 20 includes at least one PDE 41, which manages the position or geographic location determination of each mobile station 10, including providing the acquisition assistance data to the mobile station. The PDE system 41 is essentially a general purpose programmable device with an interface for data communication via the network 20. The PDE 41 stores or has access to a complete and up to date set of the satellite data for the satellites 61 needed to allow computation of position based on pseudorange measurements from satellite signals. The data may include data for the entire constellation of satellites 61 or be limited somewhat for satellites expected to transmit into some relatively large geographic region over which the operator offers related services, e.g. over the Americas.

To allow the PDE 41 to parse the satellite data down to assistance data needed by mobile stations at particular locations, the PDE 41 computes a pre-fix location for each mobile station 10 when the mobile station requests acquisition assistance data. The pre-fix determination uses base station data regarding base stations of the wireless communication network. Hence, the PDE 41 contains or has access to databases of network almanac information, typically a base station almanac (BSA) database.

The PDE 41 has a connectivity link with the WWAN 20 via the Internet 31 and a Packet Data Serving Node (PDSN) 23 which acts as the connection point between a circuit switched network, here the WWAN 20 and a packet based network, e.g. IP network. The PDSN 23 is responsible for managing point-to-point (PPP) sessions between the mobile provider's core IP network and the mobile station.

Essentially, when operating via the WWAN 20, the mobile station 10 sends a request message through the network to the PDE 41. Using the data from the BSA, the PDE 41 obtains a preliminary fix on the current position of the requesting mobile station 10, e.g. using an AFLT technique. Based on the preliminary fix, the PDE 41 parses satellite data, so as to develop a subset thereof that is applicable as acquisition assistance data for the mobile station 10 at an approximate location or region corresponding to the preliminary location fix. For example, the position determining entity might provide ephemeris and/or almanac data for just the satellites that are serviceable to the mobile station's location, i.e. those satellites from which the mobile station might expect to receive signals at its current location corresponding to the preliminary fix. The PDE 41 then sends this information for the identified location to the mobile station 10. The mobile station 10 will, in turn, use this information (also known as aiding records), for multiple satellite pseudorange measurements. Depending on the device/network configuration, the mobile station 10 or the PDE 41 can then calculate a final fix using these pseudorange measurements.

A WLAN 50 may also provide services to the dual mode mobile station 10 via Access Points (APs) 51 one of which appears in the drawing. The AP 51 comprises any device that allows wireless-enabled computers and other devices to communicate with a wired network. The WLAN 50 may comprise a wireless network compliant with the standards governed by, e.g., IEEE 802.11. The AP 51 may also be implemented as a separate device or combined with the router 52.

The router 52 transfers packets between networks. The router 52 chooses the next best link to send packets on in order to reach closer to the final destination. The router uses Internet Protocol (IP) packet headers and routing tables, as well as internal protocols to determine the best path for each packet. The router 52 may add a built-in access point (AP) function to a multi-port Ethernet router. This combines multiple Ethernet networks with wireless connections as well. The routers 52 may implement the Network Address Translation (NAT) protocol that enables multiple network devices to share a single IP address, which are generally provided by the Internet Service Provider (ISP). Typically, the router 52 also has the ability to provide port-based control, firewall management and Dynamic Host Configuration Protocol (DHCP) services for all devices.

When the mobile station 10 is within the coverage area of the WLAN 50, the mobile device 10 communicates encoded Internet Protocol (IP) packets (either voice bearing or data bearing) to and from the AP 51. When the mobile station 10 is beyond the coverage area of the WLAN 50, the mobile station 10 utilizes the WWAN 50 for communication.

The WLAN 50 maintains communication link via a control server 53 with WWAN, Public Switched Telephone Network (PSTN) 71 and Public Data Network (PDN) 72. The control server 53 controls and routes communication traffics between different networks, i.e. WLAN 50, PSTN 71 and PDN 72 and other network having a connectivity link with the control server 53. The dual-mode mobile station 10 is configured to establish wireless network connectivity to two different types of wireless networks. In the illustrated embodiment, the dual-mode mobile device 10 is capable of establishing a first network connection to the WLAN 50 via the AP 51, and a second network connection to the WWAN 20 via the base station 21. In this example, however, the WLAN 50 does not support location determinations.

The deployment of wireless network creates a need for a handoff function to handover service from one network type, e.g. the WWAN to another network type, e.g. the WLAN because it is beneficial to system performance to handoff the mobile station from the WWAN to the WLAN or from the WLAN to the WWAN. Handoff may occur during an ongoing voice call or other active communication (active handoff) or at a time when the mobile device is not actively engaged in a voice or data communication (idle state handoff). The handoff requires voice services as well as data or application services provided in one of the two networks to be serviceable in the other of the two networks after handoff. In this example, the GPS position determination service provided on the mobile station 10 in the WWAN area is serviceable in the WLAN area, by storing a determined position as the mobile station transitions to the WLAN service.

The dual mode mobile station 10 may take many forms. For example, some mobile stations may be mobile telephone stations, at least some with enhanced display and user input capabilities to support browsing and other data communications applications in addition to voice telephone service. Some of these data services may be location based and require a fix on position of the mobile station. Other mobile stations may comprise Portable Digital Assistants (PDAs) with built-in wireless communication capabilities. As another alternative, a wireless device such as a mobile transceiver having data communication capabilities may be connected to a portable computing device such as a handheld or laptop type computer.

Figure 2:
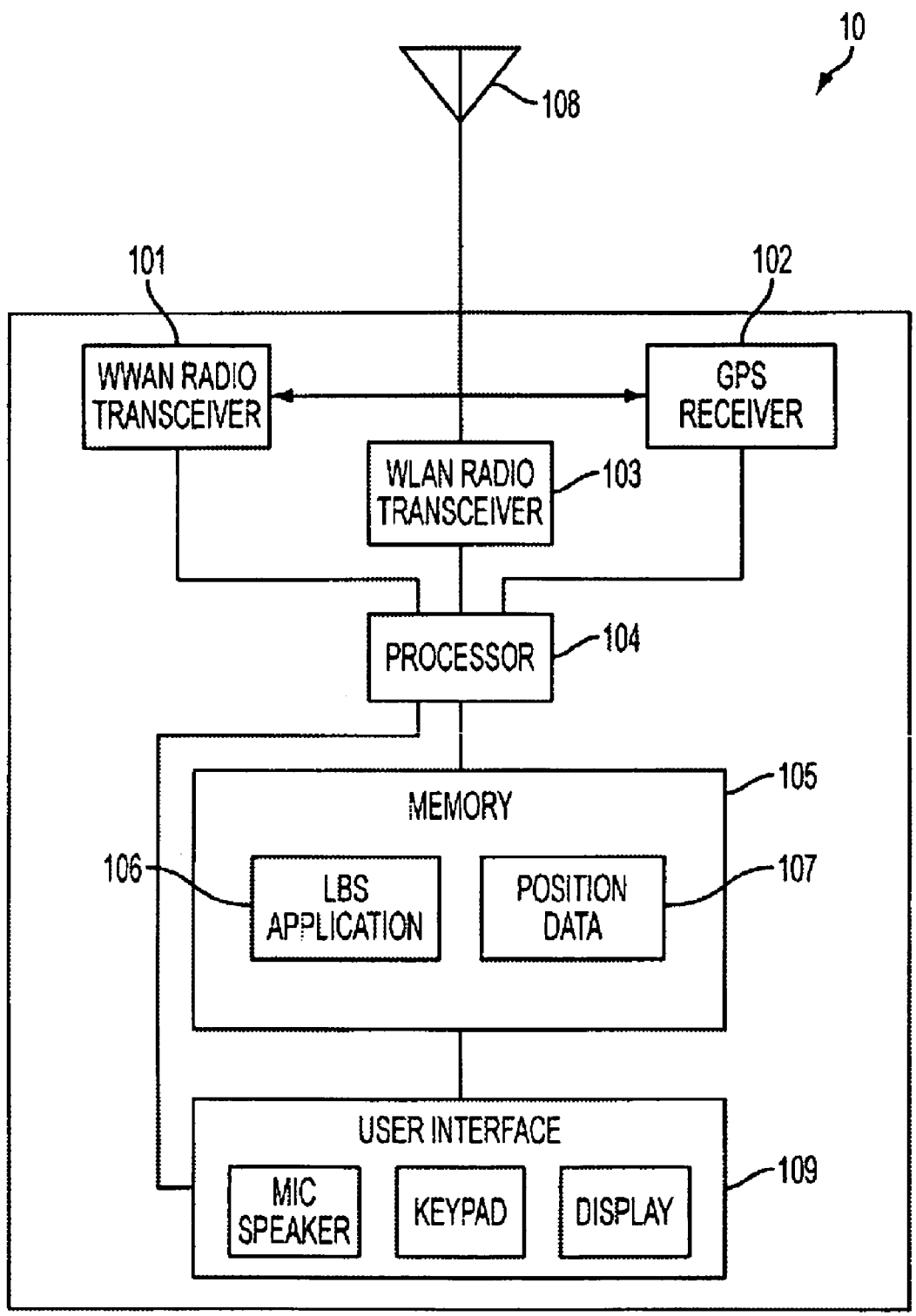
FIG. 2 is a simplified schematic diagram of a dual mode mobile station of FIG. 1.

FIG. 2 is a schematic diagram of a dual mode mobile station 10 of FIG. 1. Referring to FIG. 2, the dual mode mobile station 10 includes a wireless wide area network (WWAN) radio transceiver 101, a wireless local area network (WLAN) radio transceiver 102 and a GPS receiver 103 for communication via links with the WWAN and the WLAN and for receiving signals from the satellites, respectively. The WWAN radio transceiver 101 typically comprises a transmitter and a receiver (not shown), which respectively transmit outgoing radio frequency (RF) signals to a BTS of the WWAN and receive incoming RF signals from the WWAN, such as voice communications, text messaging, email and the like, via an antenna 108. The transceiver 101, for example, may be a CDMA, W-CDMA or Long Term Evolution (LTE) transceiver compatible with one or more of the current standards. While a single antenna 108 is illustrated in FIG. 2, it is to be understood that multiple antennas and/or different types of antennas may be utilized based on the types of signals being received. The RF signals transmitted between the mobile station 10 and the WWAN may include both traffic and control signals, which are used to establish and maintain communication with another party or destination, and may provide uplink and/or downlink communications. However, the present invention is not limited to such two-way communication systems. The foregoing components of the mobile station 10 may be included in many conventional mobile terminals and their functionality is generally known to those skilled in the art.

Still referring to FIG. 2, The WLAN radio transceiver 103, in cooperation with the processor 104, communicates with one or more access points (APs) of the WLAN. The transceiver 103, for example, may be a WiFi transceiver compatible with one or more of the current standards. The WLAN radio transceiver 103 and the WWAN radio transceiver 101 support different associated wireless communication protocols for the WWAN and the WLAN, which generally are uncoordinated with one another. The two wireless communication have different coverage distance, that is the WLAN is serviceable in a relatively short range, e.g. 100 meter or less and the WWAN has a relatively long coverage distance, e.g. on the order of kilometers. The WWAN and WLAN in our example both support packet communications, which may be used for data and/or voice communication applications. The WWAN communication may also offer a circuit switched voice service.

The mobile station 10 also includes a user interface 109, which includes suitable components to interface with the user, such as a keypad, a microphone/speaker for voice communication services, a display, for example, a backlit LCD display, or the like. The user interface 109, connected to a memory 105 and the processor 104, provide suitable input-output functions for the mobile station 10, such as controlling user input and displaying results.

The GPS receiver 102, in cooperation with the processor 104, provides a processing system (apparatus or circuit)/method configured to process location signals, such as ranging signals, received from GPS satellites 61. The mobile station 10 further includes a memory 105 in which satellite data received via the GPS receiver 102, a position data of the mobile station received from the PDE 41 and a Location Based Service (LBS) application 107 for providing the LBS are stored.

While, for example, the position calculation application 106, the LBS application 107, and the processor 104 are illustrated as distinct blocks in FIG. 2, it is to be understood that the functionality of these blocks may be combined into a single processor or spread across a plurality of different processors and/or other hardware configured to operate in the manner described herein. Furthermore, while the position calculation application 106 and the GPS receiver 102 are shown as distinct blocks in FIG. 2, it is to be understood that aspects of the functionality of these blocks may be spread across different processors or circuitry and that the GPS receiver 102 may also, in part, provide the position calculating application 106.

The dual mode station 10 is equipped with a GPS receiver 102 so that it can receive RF signals from the GPS satellites. Since the dual mode stations equipped with the GPS receiver have three kinds of communication links, the dual mode mobile stations have diverse activity modes depending upon activity of each of the three communication links.

When the WWAN radio transceiver 101 operates in an idle mode, the GPS receiver 102 is turned on, but does not attempt to receive satellite signals, e.g. to establish and keep alive regulations with network elements during roaming. The WWAN transceiver 101 is turned on and transmits/receives RF signals to/from BTS 21 occasionally. On the other hand, when WWAN radio transceiver 101 is in an active mode, the GPS receiver 102 is turned on, but does not attempt to receive satellite signals. The WWAN transceiver is turned on and transmits or receives RF signals to or from the BTS 21 steadily, e.g. during a voice call or a multimedia session. When WWAN radio is turned off, the WWAN radio transceiver 101 stops operating, for example, when the mobile station 10 enters into the WLAN coverage area.

With respect to the WLAN radio signals, the dual mode mobile station operates in two modes. In an idle mode, the WLAN radio transceiver 103 is turned on and attempts to receive RF signals from APs 51 periodically. The WLAN radio transceiver 103 is turned on, but occasionally transmits RF signals to the WLAN AP 51. In an active mode, the WLAN radio transceiver is turned on and attempts to transmit or receive RF signals steadily to or from the AP 51. When the WLAN radio transceiver 103 is turned off, the WLAN transceiver 103 stops operating.

Before discussing acquisition assistance, however, it may be helpful to briefly review techniques for determining mobile station position based on the Global Positioning System (GPS). The GPS is a positioning system that provides accurate, worldwide, three-dimensional position information to users with appropriate receiving equipment. GPS includes a number of satellites, currently 24 satellites orbiting in six orbital planes with four satellites per plane, and a worldwide ground control and monitoring network for monitoring the health and status of the satellites. Each of the satellites transmits a signal with a specific structure and comprising navigation data. GPS receiving equipment receives the signals from a subset of the number of satellites and determines the current position of the equipment from the received signals.

GPS receivers use measurements from several satellites 61 to compute position. GPS receivers normally determine their position by computing time delays between transmission and reception of signals transmitted from satellites and received by the receiver on or near the surface of the earth. The time delays multiplied by the speed of light provide the distances from the receiver to the satellites 21 from which the particular receiver takes its measurements. The measured distances from known satellite positions then enable computation of the position of the receiver.

More specifically, each GPS signal available for commercial use utilizes a direct sequence spreading signal defined by a unique Pseudo-random Noise (PN) code, which uniquely identifies the particular satellite. GPS receivers determine the time delays between transmission and reception of the signals by comparing time shifts between the received PN code signal sequence and internally generated PN signal sequences. The measured delays are referred to as "pseudoranges." A set of three pseudorange measurements together with knowledge of absolute times of transmission of the GPS signals and satellite positions enables a GPS computation of the receiver's latitude and longitude. If the data includes a pseudorange measurement, knowledge of transmission time and satellite position for a fourth satellite, the position computation can also determine the receiver's altitude.

Hence, knowledge of transmission times and satellite positions is critical to the position computation. Each of the GPS satellites broadcasts a "satellite navigation message." An absolute time signal in the satellite navigation message allows the receiver to determine a time tag for when each satellite transmitted each signal detected by the GPS receiver. Ephemeris data in the satellite navigation message identifies the satellites and their orbits. Almanac data is a subset of ephemeris data. Each GPS satellite broadcasts the almanac data for all the GPS satellites in the GPS constellation.

Without any prior knowledge, e.g. as to the approximate position, an autonomous GPS receiver may need to search through all satellites, all possible code delays, and all possible frequency offsets in order to identify the Gold code and delay parameter of the received signal. Hence, the initial signal acquisition may require a multi-dimensional search, thereby rendering the initial acquisition a time-consuming task requiring many computational resources. To address such a need for time saving of the initial acquisition, an assisted GPS system has been introduced.

In a full GPS receiver configuration, the individual receiver locks onto one of the satellite signals and captures the almanac and ephemeris data from the satellite navigation message in the particular satellite signal. However, for mobile station acquisition assistance, the PDE 41 provides parsed satellite information to a mobile station 10 attempting a GPS position fix. Essentially, the PDE 41 receives or stores the almanac and ephemeris data; and the PDE parses that data down to a subset thereof applicable to the satellites expected to be in view from a mobile station's current location, based on a preliminary fix of the mobile station's position. The selection of the appropriate subset of the satellite data, to assist a particular mobile station in its GPS pseudorange measurements, therefore depends on knowledge of the preliminary position fix of the particular mobile station 10. The preliminary position fix requires at least some knowledge of the facilities of the wireless communication network 20 or 50 serving the mobile station 10 at the station's current position.

In operation, the PDE 41 receives a request for acquisition assistance from a mobile station. Assume for example, that the PDE 41 receives a request for acquisition assistance from a mobile station 10 currently operating through the WWAN 20. The request includes at least one item of information, which identifies a portion of a mobile wireless communication network 20 through which the mobile station 10 is receiving communication service. Location data for a preliminary fix is retrieved from a database (not shown), based on the identifying information. The PDE 41 uses location data from the database to determine the subset of satellite data for use as the acquisition assistance data, for the mobile station 10 at its current position. The PDE 41 transmits the resulting acquisition assistance data to the mobile station 10 for use in acquisition of a position measurement based on signals SS1-SS3 from one or more satellites 61.

The PDE or another node of the wireless communication network that provides the Acquisition Assistance (AA) selects the subset of GPS satellite ephemeris data and/or almanac data for a particular mobile station based on a preliminary fix of the mobile station's location. However, in many current deployments, the preliminary fix (pre-fix) uses the data from a BSA database. Essentially, the wireless network uses its resources to allow a pre-fix determination based on network information from the BSA. Then the PDE or another node compiles the appropriate acquisition assistance data and sends it to the requesting mobile station, for use in taking measurements of the appropriate satellite signals. Hence, even the assisted GPS position determination is dependent on the availability and accuracy of serving base station information in the service provider's BSA database.

Among the adopted position location technologies for Enhanced 911 (E911), Assisted GPS (A-GPS) is one of the solutions. For current Code Division Multiple Access (CDMA) systems, such GPS techniques are described in standard specification documents such as TIA/EIA/IS-801-1 of November 2000. During a voice call involving the mobile station, real-time GPS location information may be obtained and sent to a receiving entity. To obtain real-time GPS location information, the mobile station receives the signals from a GPS system as well as communicates with a location server in the wireless communication network. The location server may include a Position Determination Entity (PDE) which has a GPS receiver for wirelessly receiving information from the GPS system. The mobile station obtains GPS acquisition assistance data and uses it to perform what is referred to as a "GPS fix" during a voice call. During the GPS fix, the mobile station tunes to a GPS frequency different from the traffic channel of the voice call in order to obtain GPS pseudorange data from the GPS system. The mobile station obtains the GPS pseudorange data by measuring GPS signal delays at the mobile station. After the GPS fix, the mobile station retunes back to the traffic channel of the voice call. The mobile station 10 may be configured to compute the final fix, but in our example, this intense processing is done by the PDE. Here, sometime during the voice call, the mobile station may send the GPS pseudorange data to the location server which calculates the location of the mobile station based on it. The location server/PDE may send the location of the mobile station to the receiving entity (e.g. 911 emergency center or PSAP) or, if received by the mobile station, the mobile station may send the location of the mobile station to the receiving entity.

Figure 3:
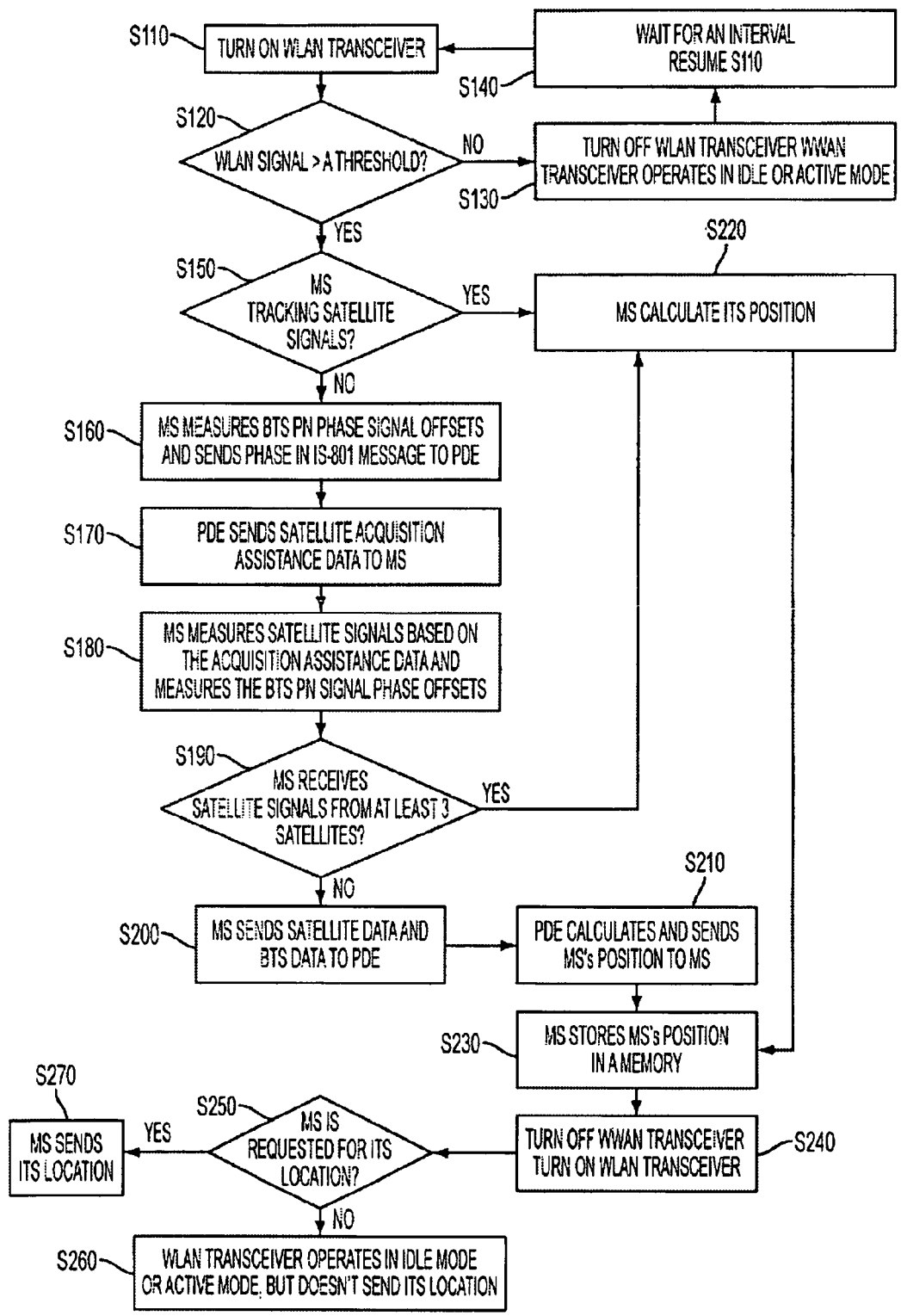
FIG. 3 is a flow diagram illustrating a process of providing position information to the dual mode mobile station in an environment where the RF signals trigger that the mobile station transits from the WWAN to the WLAN.

The wireless features of the WWAN, however, may not be available when the mobile station operates in the WLAN. Typically, the WWAN transceiver is turned off. At some locations, e.g. in some buildings, GPS satellite signals may be unavailable. Hence, assisted GPS communications with the PDE may not be practical. In order to provide the position determination service in environment where GPS signals and/or wireless cellular network are not serviceable, a method for providing position determination service to mobile stations using a WLAN will be discussed below. Essentially, a location determination is made and position data is stored, at the time of transition from the WWAN into the WLAN. FIG. 3 is a flow diagram illustrating the method for providing its position information for the dual mode mobile station to use while in an indoors environment or the like where the RF signals from wireless cellular network is not available, but the WLAN is serviceable.

Referring to FIG. 3, the dual mode mobile station 10 turns on a WLAN radio transceiver 103 (S110). The mobile station turning on the WLAN radio transceiver 103 operates in an idle mode in which the WLAN radio transceiver 103 periodically attempts to receive and transmits RF signals from/to at least an Access Point (AP) 51. Subsequently, the dual mode mobile station 10 determines whether the RF signals received from the AP exceeds a threshold level (S120). If the RF signal from the AP 10 does not exceed the threshold level, the mobile station turns off the WLAN radio transceiver 103 and enables the WWAN transceiver 101 to operate in an idle mode or active mode (S130). Then, the dual mode mobile station waits for a pre-determined interval and start the initial step S110 again (S140).

If the RF signal from the AP exceeds the threshold level, it means the mobile station 10 enters into an area where the WLAN communication link is available. Then, the mobile station 10 determines whether the mobile station recently acquired the RF signals from satellites (S150). If the mobile station does not acquire the RF signals from satellites, the mobile station requests and receives acquisition assistance of satellite data from the WWAN (S160).

In the step S160, the acquisition assistance of the satellite data is provided via the WWAN 20 as follows. The mobile station 10 uses its WWAN radio transceiver 101 to receive RF signals from the BTS 21 and measure the PN signal phase offset corresponding to each signal. The mobile station 10 then sends the PN signal phase offset measurements and the information that identifies the corresponding BTSs 21 together with the request of location assistance data, inside a Standards compliant IS-801 message via one of the BTS/BSC which then serves for the mobile station, the corresponding PDSN 23 and over the internet to the PDE 41.

In response to the request for location assistance data, the PDE 41, based on measurement and information about the BTSs 21 from the mobile station 10, computes and provides the mobile station with the satellite acquisitiona assistance data that are required to acquire the satellite signals very quickly (S170). The satellite acquisition assistance data includes local time and position estimates, satellite ephemeris and clock information, and a visible satellite list (which generally varies with the location of the mobile station). The satellite acquisition assistance data are sent to the mobile station via the interne 31, PDSN 23, and a serving BTS 21, in a reverse direction. The mobile station measures satellite signals based on the satellite acquisition assistance data and measures the BTS PN signal phase offsets. (S180). The mobile station 10 measures the pseudo-ranges of the satellites and measures PN signal offsets of RF signals from as many BTSs 21 as it can.

Following the measurements, the mobile station determines whether it receives the satellite signals from at least three satellites about which the PDE 41 has sent the satellite acquisition assistance data (S190). If the mobile station 10 receives the satellite signals from at least three satellites, the step S220 is performed. If the mobile station 10 does not receive the satellite signals from at least three satellites, the mobile station 10 sends satellite data and BTS data which the mobile station 10 has obtained to the PDE 41 inside an IS-801 message (S200). The satellite data includes the pseudo-range measurement of satellite signals, satellite identifiers and health of the satellite signals, and the BTS data includes BTS identifiers and PN signal phase offsets.

After receiving the satellite data and the BTS data, the PDE 41 calculates location of the mobile station 10 as well as the quality and reliability of the calculated location and sends them to the mobile station 10 (S210). In the step 150, if the mobile station 10 has acquired satellite signals enough to calculate the position of the mobile station, the mobile station calculates its position (S220). Whether the mobile station receives its location from the PDE 41 via the acquisition assistance from the WWAN 10 or has calculated its location by itself from stored satellite data, the mobile station 10 stores its location in the memory (S230).

After storing the location of the mobile station in its memory, the mobile station turns off the WWAN radio transceiver 101 and turns on the WLAN transceiver 103 (S240). Although not shown, there will often be one or more signaling steps to register the mobile station for communication in the WLAN. The mobiles station 10 stops receiving acquisition assistance data from the WWAN 20 and utilizes the location stored in the mobile station for location determination during a period when the mobile station stays within the WLAN area.

After entering into the WLAN area, the position data of the mobile station 10 may be used in various ways. In one case, the mobile station, itself, needs the position data. For example, a location based service (LBS) application 106, such as receiving traffic status and finding nearest point of interest, that is installed in the mobile station 10 by user or automatically, needs position data of the mobile station 10. Alternatively, an external entity requires the position data of the mobile station 10 to provide application services. For example, when the mobile station 10 makes E911 call in the WLAN area, a PDE of the WLAN needs and requests the position data of the mobile station.

It is determined whether the position data is requested from the external entity (S250). When the position data is not requested from the external entity, the WLAN radio transceiver 103 operates either in an idle mode or an active mode while not sending its location information (S260). However, when the mobile station needs to employ various services based on its location such as the LBS, the mobile station retrieves the stored position data of the mobile station and utilizes the position data for the LBS application. On the other hand, when the external entity requests the position data of the mobile station 10, WLAN radio transceiver 103 turns into an active mode and sends the location of the mobile station stored in the mobile station to the external entity (S270). When the mobile station does not receive the request of location data, the WLAN radio transceiver 103 stays in an idle mode or turns into an active mode for performing an activity other than sending its location.

While the mobile station does not update its position and uses its stored location in the WLAN area, the mobile station still can obtain accurate position information because the WLAN area usually is relatively small and the GPS position is not so different inside the WLAN area. Moreover, the dual mode mobile station can save power and spend less time to determine its location in a WLAN area, since the dual mode mobile station uses its already stored location information for determining its position in the WLAN area, which is obtained at the time of mobile station's entrance into the WLAN area, while not trying to calculate its position as same as in the WWAN area in which the acquisition assistance data is obtained from a node of the WWAN and position of the mobile station is calculated based on the assistance data.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

WLAN: Wireless Local Area Network
WWAN: Wireless Wide Area Network
BSA: Base Station Almanac
AFLT: Advanced Forward Link Trilateration
GPS: Global Positioning System
PDE: Position Determining Entity
MS: Mobile Station
AA: Acquisition Assistance
RF: Radio Frequency
MSC: Mobile Switching Center
CDMA: Code Division Multiple Access
W-CDMA: Wide band Code Division Multiple Access
BTS: Base Transceiver System
PDSN: Packet Data Serving Node
AP: Access Point
UWB: Ultra WideBand
IP: Internet Protocol
NAT: Network Address Translation
ISP: Internet Service Provider
DHCP: Dynamic Host Configuration Protocol
PSTN: Public Switched Telephone Network
PDN: Publici Data Network
PDA: Portable Digital Assistant
LBS: Location Based Service
PN: Pseudo-random Noise
LTE: Long Term Evolution

What is claimed is:

1. A method for determining position of a mobile station equipped with a Global Positioning System (GPS) receiver, the mobile station being operable in a wireless wide area network (WWAN) and a wireless local area network (WLAN), comprising steps of:
   (a) detecting the mobile station entering into an area of the WLAN;
   (b) determining position of the mobile station, based on satellite signals from the GPS receiver and/or signals received from the WWAN before or at the time of entrance into the WLAN area, responsive to detecting of the mobile station entering into the WLAN area;
   (c) storing the position of the mobile station determined in the step (b) in the mobile station for a position of the mobile station in the WLAN area; and
   (d) responsive to a request for location of the mobile station, while the mobile station is operating through the WLAN, providing the stored position of the mobile station determined in the step (b) as the position of the mobile station in the WLAN area.

2. The method of claim 1, wherein the step (a) is performed by determining whether a radio signal from the WLAN exceeds a predetermined threshold.

3. The method of claim 1, wherein the mobile station retrieves the stored position of the mobile station when a location based service application installed in the mobile station requests the position of the mobile station.

4. The method of claim 1, wherein the mobile station sends the stored position via a communication link of the WLAN to an external entity which requests the position of the mobile station.

5. The method of claim 2, further including steps of:
   stopping the mobile station from communicating using radio signals via the WLAN, when the detected radio signals via the WLAN does not exceed the predetermined threshold; and
   thereafter enabling the mobile station to communicate via radio signals of the WWAN.

6. The method of claim 1, wherein the step (b) includes steps of:
   (b1) deciding whether the mobile station has position information of satellites;
   (b2) calculating position of the mobile station based on the position information of satellites when the mobile station has position information of satellites; and
   (b3) storing position of the mobile station in the mobile station.

7. A method for determining position of a mobile station equipped with a Global Positioning System (GPS) receiver, the mobile station being operable in a wireless wide area network (WWAN) and a wireless local area network (WLAN), comprising steps of:
   (a) detecting whether the mobile station enters into the WLAN area;
   (b) determining position of the mobile station based on satellite signals from the GPS receiver and RF signals from the WWAN before or at the time of entrance into the WLAN area upon detecting when the mobile station enters into the WLAN area; and
   (c) storing the position of the mobile station determined in the step (b) in the mobile station for a position of the mobile station in the WLAN area,
   wherein the step (b) includes steps of:
   (b1) deciding whether or not the mobile station has position information of satellites;

(b2) calculating position of the mobile station based on the position information of satellites when the mobile station has position information of satellites;

(b3) storing position of the mobile station in the mobile station;

(b4) the mobile station measuring PN signal phase offset of radio signals from a base station of the WWAN when the mobile station does not have position information of satellites;

(b5) the mobile station sending information about the PN signal phase offset and Base Transceiver Systems (BTSs) corresponding to the PN signal phase offset and requesting the position information of satellites corresponding to satellites that are available to the mobile station based on the information about the PN signal phase offset and the BTSs to a Position Determination Entity (PDE);

(b6) the PDE sending satellite acquisition assistance data identifying satellites serviceable to the mobile station based on the information about PN signal phase offset and the BTS;

(b7) the mobile station receiving satellite signals from the serviceable satellites identified by the PDE; and (b8) determining position of the mobile station from satellite signals received from at least three of the serviceable satellites.

8. The method of claim 7, wherein the step (b7) further includes steps of:

(b71) the mobile station determining pseudo ranges of at least three of the serviceable satellites; and (b72) the mobile station measuring PN signal offsets of BTSs.

9. The method of claim 7, wherein the step (b) further includes steps of:

(b9) calculating position of the mobile station when the mobile station receives satellite signals from at least three of the serviceable satellites in the step (b8); and (b10) storing position of the mobile station in the mobile station.

10. A method of claim 7, wherein the step (b) further includes steps of:

(b11) the mobile station sending the obtained information about satellites and BTSs to the PDE when the mobile station does not receive satellite signals from at least three of the serviceable satellites in the step (b8);

(b12) the PDE calculating and sending location information of the mobile station to the mobile station; and (b13) the mobile station storing the location information.

11. A dual mode mobile station operable in a wireless wide area network (WWAN) and a wireless local area network (WLAN), comprising:

one or more transceivers, for wireless communications via the WWAN, for wireless communications via the WLAN, and for receiving signals from one or more GPS satellites;

a processor coupled to the one or more transceivers for controlling operations of the dual mode mobile station;

a memory coupled to the processor; and programming stored in the memory, wherein execution of the programming causes the processor to control operations of the dual mode mobile station so as to implement functions for determining position of the mobile station, comprising:

determining a position of the mobile station from position data received from the WWAN and/or from measurements of GPS satellite signals received by the GPS receiver;

upon the mobile station entering into an area of the WLAN, storing the determined position of the mobile station in the memory as the position of the mobile station while operating via the WLAN area; and responsive to a request for location of the mobile station, while the mobile station is operating through the WLAN, providing the stored position of the mobile station as the position of the mobile station in the WLAN area.

12. The mobile station of claim 11, wherein the position of the mobile station is received from a position determination entity (PDE) that is located in the WWAN or the WLAN based on mobile station measurements of the satellite signals from the GPS receiver and location acquisition assistance data from the WWAN as the mobile station enters into the WLAN.

13. The mobile station of claim 11, wherein the entrance of the mobile station into the WLAN area is known by the time when the RF signal from the WLAN exceeds the threshold level.

14. The mobile station of claim 11, wherein programming stored in the memory includes a location based service (LBS) application for requesting the position of the mobile station, wherein the stored position of the mobile station is provided to the LBS application in response to the request of the LBS application.

15. The mobile station of claim 11, wherein the function of providing the stored position includes sending the determined position to a node which requests the position of the mobile station when the mobile station requests an application service which requires the position of the mobile station.

* * * * *